(12) United States Patent
van Diggelen

(10) Patent No.: US 11,428,822 B2
(45) Date of Patent: Aug. 30, 2022

(54) METHODS AND SYSTEMS FOR LOCATION DETERMINATION

(71) Applicant: Google LLC, Mountain View, CA (US)

(72) Inventor: Frank van Diggelen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 156 days.

(21) Appl. No.: 16/316,880

(22) PCT Filed: Nov. 16, 2017

(86) PCT No.: PCT/US2017/062073
§ 371 (c)(1),
(2) Date: Jan. 10, 2019

(87) PCT Pub. No.: WO2018/102146
PCT Pub. Date: Jun. 7, 2018

(65) Prior Publication Data
US 2019/0285754 A1    Sep. 19, 2019

Related U.S. Application Data

(60) Provisional application No. 62/428,778, filed on Dec. 1, 2016.

(51) Int. Cl.
*G01S 19/42*    (2010.01)
*G01S 19/22*    (2010.01)

(52) U.S. Cl.
CPC ........... *G01S 19/428* (2013.01); *G01S 19/22* (2013.01)

(58) Field of Classification Search
CPC ....... G01S 19/22; G01S 5/0273; G01S 19/428
See application file for complete search history.

(56) References Cited

U.S. PATENT DOCUMENTS 4,949,268 A * 8/1990 Nishikawa ............. G01C 21/28
340/995.1
5,867,122 A * 2/1999 Zahm ...................... G01S 19/14
342/357.33

(Continued)

FOREIGN PATENT DOCUMENTS

EP    2634599 A1 *  9/2013  ............. G01S 19/28
EP    3 001 224 A1   3/2016

OTHER PUBLICATIONS

Ublox—"GPS Essentials of Satellite Navigation Compendium." Copyright 2009. www.u-blox.com (14 pages). (Year: 2009).*

(Continued)

*Primary Examiner* — Gregory C. Issing
(74) *Attorney, Agent, or Firm* — McDonnell Boehnen Hulbert & Berghoff LLP

(57) ABSTRACT

Methods and systems for location determination are described herein. An example implementation may involve receiving signals from a set of satellites to determine a general location of a receiver. After receiving a signal from a satellite, the receiver may-determine an angle of reception that indicates an orientation of the satellite relative to the receiver. The receiver may further obtain topography information for the general location that indicates the positions and elevations of features (e.g., buildings) at the general location. For instance, the receiver may use elevation maps or sensors to determine the topography information. Using the topography information and determined angles of receptions, the receiver may identify any signals that reflected off a feature prior to reaching the receiver. As a result, the receiver may determine and use the reflected path traveled by a reflected signal to refine the general location of the receiver.

15 Claims, 9 Drawing Sheets

(56) References Cited

U.S. PATENT DOCUMENTS

| | | | |
|---|---|---|---|
| 5,974,329 A * | 10/1999 | Wylie | G01S 5/0215 342/457 |
| 6,282,426 B1 * | 8/2001 | Wang | G01S 5/0036 342/450 |
| 6,417,801 B1 | 7/2002 | Van Diggelen et al. | |
| 6,542,820 B2 | 4/2003 | LaMance et al. | |
| 6,560,534 B2 | 5/2003 | Abraham et al. | |
| 6,590,530 B2 | 7/2003 | Van Diggelen et al. | |
| 6,721,656 B2 * | 4/2004 | Morita | G01S 19/28 701/469 |
| 6,819,707 B2 | 11/2004 | Abraham et al. | |
| 6,829,534 B2 | 12/2004 | Fuchs et al. | |
| 6,892,055 B2 * | 5/2005 | Rosenfeld | G01S 5/0215 375/349 |
| 6,958,726 B1 | 10/2005 | Abraham et al. | |
| 6,975,266 B2 | 12/2005 | Abraham et al. | |
| 6,999,726 B2 * | 2/2006 | Rosenfeld | G01S 5/02 375/349 |
| 7,158,080 B2 | 1/2007 | Van Diggelen | |
| 7,158,882 B2 | 1/2007 | Abraham et al. | |
| 7,245,253 B2 | 7/2007 | Van Diggelen et al. | |
| 7,253,768 B2 | 8/2007 | Van Diggelen et al. | |
| 7,256,732 B2 | 8/2007 | De Salas et al. | |
| 7,489,269 B2 | 2/2009 | Van Diggelen et al. | |
| 7,548,816 B2 | 6/2009 | Riben et al. | |
| 7,574,221 B2 * | 8/2009 | Guvenc | G01S 5/0215 455/404.2 |
| 7,924,947 B2 | 4/2011 | Tapucu et al. | |
| 7,940,214 B2 | 5/2011 | Van Diggelen et al. | |
| 7,987,048 B2 | 7/2011 | Van Diggelen | |
| 8,009,092 B2 | 8/2011 | Abraham et al. | |
| 8,032,301 B2 | 10/2011 | Van Diggelen et al. | |
| 8,134,500 B2 | 3/2012 | Van Diggelen et al. | |
| 8,164,518 B2 | 4/2012 | Van Diggelen | |
| 8,212,719 B2 | 7/2012 | Van Diggelen et al. | |
| 8,301,370 B2 | 10/2012 | Van Diggelen | |
| 8,301,376 B2 | 10/2012 | Fuchs et al. | |
| 8,514,126 B2 | 8/2013 | Van Diggelen et al. | |
| 8,571,147 B2 | 10/2013 | Van Diggelen et al. | |
| 8,581,779 B2 | 11/2013 | Van Diggelen et al. | |
| 8,717,233 B2 * | 5/2014 | Ashjaee | G01S 19/35 342/357.25 |
| 8,823,587 B2 | 9/2014 | Abraham et al. | |
| 8,854,259 B2 | 10/2014 | Van Diggelen et al. | |
| 8,902,104 B2 | 12/2014 | Van Diggelen | |
| 8,930,137 B2 | 1/2015 | Van Diggelen | |
| 8,963,773 B2 | 2/2015 | Van Diggelen et al. | |
| 8,977,288 B2 | 3/2015 | Abraham et al. | |
| 9,037,154 B2 | 5/2015 | Van Diggelen et al. | |
| 9,274,225 B2 | 3/2016 | Abraham et al. | |
| 9,369,987 B2 * | 6/2016 | Wang | G01S 5/14 |
| 9,405,013 B2 | 8/2016 | Van Diggelen | |
| 9,482,739 B2 | 11/2016 | Mole et al. | |
| 9,562,976 B2 | 2/2017 | Van Diggelen et al. | |
| 9,664,769 B2 * | 5/2017 | Owen | G01S 19/072 |
| 9,681,269 B2 * | 6/2017 | MacGougan | H04W 4/023 |
| 9,704,268 B2 | 7/2017 | Soto et al. | |
| 9,766,349 B1 * | 9/2017 | Madhow | G01S 19/11 |
| 9,857,474 B2 * | 1/2018 | Tan | G01S 19/258 |
| 10,386,493 B2 * | 8/2019 | Irish | G01S 19/22 |
| 10,459,089 B2 | 10/2019 | Van Diggelen et al. | |
| 10,520,606 B2 | 12/2019 | Abraham et al. | |
| RE48,176 E | 8/2020 | Van Diggelen et al. | |
| 11,175,409 B2 | 11/2021 | Van Diggelen et al. | |
| 2003/0008671 A1 | 1/2003 | Lundgren et al. | |
| 2004/0203915 A1 | 10/2004 | Van Diggelen et al. | |
| 2008/0125971 A1 | 5/2008 | Van Diggelen et al. | |
| 2008/0186229 A1 | 8/2008 | Van Diggelen et al. | |
| 2008/0189037 A1 | 8/2008 | Van Diggelen et al. | |
| 2008/0238772 A1 * | 10/2008 | Soloviev | G01S 19/22 342/357.25 |
| 2009/0231192 A1 | 9/2009 | Van Diggelen et al. | |
| 2010/0176992 A1 * | 7/2010 | T'siobbel | G01S 19/425 342/357.25 |
| 2011/0148700 A1 | 6/2011 | Lasagabaster et al. | |
| 2011/0199260 A1 | 8/2011 | Garrett et al. | |
| 2012/0098700 A1 | 4/2012 | Van Diggelen | |
| 2013/0099969 A1 | 4/2013 | Van Diggelen | |
| 2013/0149974 A1 | 6/2013 | Lorenz et al. | |
| 2014/0004877 A1 | 1/2014 | Van Diggelen et al. | |
| 2014/0019044 A1 | 1/2014 | Zanutta et al. | |
| 2014/0125521 A1 * | 5/2014 | Monnerat | G01S 19/22 342/357.61 |
| 2015/0002308 A1 | 1/2015 | Walley et al. | |
| 2015/0005029 A1 | 1/2015 | Medapalli et al. | |
| 2015/0006616 A1 | 1/2015 | Walley et al. | |
| 2015/0035700 A1 * | 2/2015 | Van Diggelen | G01S 19/22 342/357.51 |
| 2015/0338522 A1 * | 11/2015 | Miller | G01S 19/22 342/357.61 |
| 2016/0146945 A1 * | 5/2016 | Kamijo | G01S 19/24 342/357.61 |
| 2016/0280401 A1 * | 9/2016 | Driscoll | G01S 19/396 |
| 2017/0242131 A1 | 8/2017 | Mole et al. | |

OTHER PUBLICATIONS

Blewitt, Geoffrey. "Basics of the GPS Technique: Observation Equations." Excerpted from "Geodetic Applications of GPS" 1997. (146 pages). (Year: 1997).*

Ng, Yuting et al. "Direct Position Estimation Utilizing Non-Line-of-Sight (NLOS) GPS Signals." Proceedings of the 29th International Technical Meeting of the Satellite Division of The Institute of Navigation (ION GNSS+ 2016) Sep. 12-16, 2016. (6 pages). (Year: 2016).*

Miura et al. "GPS Multipath Detection and Rectification Using 3D Maps." 16th International IEEE Conference on Intelligent Transportation Systems (ITSC 2013). Oct. 2013. (7 pages). (Year: 2013).*

Bressler, Julia et al. "GNSS Positioning in Non-Line-of-Sight Context—Survey." 2016 IEEE 19th International Conference on Intelligent Transportation Systems (ITSC). Nov. 1-4, 2016. (8 pages). (Year: 2016).*

Obst et al., "Multipath Detection with 3D Digital Maps for Robust Multi-Constellation GNSS/INS Vehicle Localization in Urban Areas", IEEE, Intelligent Vehicles Symposium, 2012, 184-190.

International Search Report dated Mar. 7, 2018, issued in connection with International Application No. PCT/US2017/062073 filed on Nov. 16, 2017, 4 pages.

Written Opinion dated Mar. 7, 2018, issued in connection with International Application No. PCT/US2017/062073 filed on Nov. 16, 2017, 6 pages.

Shadow Matching—Improved GNSS Accuracy in Urban Canyons Paul Groves GPS World Magazine Feb. 2012.

Urban Localizaiton and 3D Mapping Using GNSS Shadows Andrew Irish Inside GNSS Magazine Sep.-Oct. 2015.

* cited by examiner

METHODS AND SYSTEMS FOR LOCATION DETERMINATION

CROSS-REFERENCE TO RELATED APPLICATION

The present application is the US National Phase under 35 U.S.C. § 371 of International Application PCT/US2017/062073, filed Nov. 16, 2017, which claims priority to U.S. Provisional Patent Application No. 62/428,778, filed Dec. 1, 2016, the entire contents of which are herein incorporated by reference.

BACKGROUND

Smartphones, wearable computing devices, and other types of devices often include a receiver configured to perform location determination using the Global Positioning System (GPS), and other GNSS (Global Navigation Satellites Systems). GPS is a satellite-based navigation system that involves a network of satellites configured to transmit signals to Earth while circling Earth twice a day in a precise orbit. In particular, each satellite transmits signals that include information for devices to use for location determination, including an indication of the time that each signal was transmitted by the satellite and position information for the satellite. Other GNSS such as GLONASS, Galileo, BeiDou, QZSS, and IRNSS operate similarly, and, may also be used for location determination.

In order to perform location determination, a receiver may receive transmitted signals from multiple satellites and perform calculations to determine the receiver's location. For example, the receiver may use trilateration to determine its location on the surface of Earth by timing signals from at least four satellites in the GNSS. When the receiver receives a transmitted signal from a satellite, the receiver may determine the time that the signal was received at the receiver and compares that time to the time that the signal was transmitted by the satellite as indicated within the signal. Using the determined time difference, the receiver may determine how far away the satellite is positioned, and by receiving signals from at least four satellites, the receiver may perform trilateration calculations to determine its location. If the receiver has access to other measurements, such as its altitude, it may use this in the position calculation and the minimum required number of GNSS signals is reduced by one.

SUMMARY

Example implementations relate to methods and systems for location determination. In some situations, a receiver may fail to determine its location accurately due to interference by large buildings or other elevated features located in the area. In this description "interference" by buildings or other features can mean blockage and/or reflections, diffraction and scattering of signals. For instance, the receiver may use one or multiple signals that reflected off a feature prior to reaching the receiver when calculating its location. As such, the extra path traveled by a signal due to a reflection or reflections can cause errors during location determination. For example, reflections from buildings positioned 100 meters away from the receiver can cause errors of the order of 100 meters. In order to reduce errors during location determination, a receiver may identify signals that likely reflected off features prior to reaching the receiver and factor extra paths traveled by these signals when determining its location.

In one aspect, an example method is provided. The method may include receiving, at a receiver, positioning signals from a plurality of satellites, and determining a general location of the receiver. The method may further include determining respective angles of reception for the positioning signals. In some implementations, an angle of reception for a given positioning signal is indicative of an orientation of a satellite relative to the receiver. The method may further include determining topography information for the general location. For instance, the topography information may indicate a given elevation and position for one or more features in the general location. The method may further include identifying, at the receiver using the topography information and determined respective angles of reception of received positioning signals, one or more of the positioning signals that is a reflected signal. A reflected signal may correspond to a positioning signal that reflected off one or more features at the general location prior to being received at the receiver. The method may also include determining a reflected path for the one or more reflected signals, and based at least in part on the reflected path, determining a refined location of the receiver.

In another aspect, a system is provided. The system may include one or more processors, and a non-transitory computer-readable medium, configured to store instructions, that when executed by the one or more processors, cause the system to perform functions. The functions may include receiving positioning signals from a plurality of satellites, determining a general location of the system, and determining respective angles of reception for the positioning signals. In some implementations, an angle of reception for a given positioning signal is indicative of an orientation of a satellite relative to the system. The functions may also include determining topography information for the general location. For instance, the topography information may indicate a given elevation and position for one or more features at the general location. The functions may further include identifying, using the topography information and determined respective angles of reception of received positioning signals, one or more of the positioning signals that is a reflected signal. A reflected signal may correspond to a positioning signal that reflected off one or more features at the general location prior to being received at the system. The functions may also include determining a reflected path for the one or more reflected signals, and based at least in part on the reflected path, determining a refined location of the system.

In a further aspect, a non-transitory computer readable medium is provided. The non-transitory computer readable medium has stored therein instructions executable by one or more processors to cause a computing system to perform functions. The functions may include receiving positioning signals from a plurality of satellites, determining a general location of the system, and determining respective angles of reception for the positioning signals. In some implementations, an angle of reception for a given positioning signal is indicative of an orientation of a satellite relative to the system. The functions may also include determining topography information for the general location. For instance, the topography information may indicate a given elevation and position for one or more features at the general location. The functions may further include identifying, using the topography information and determined respective angles of reception of received positioning signals, one or more of the positioning signals that is a reflected signal. A reflected signal may correspond to a positioning signal that reflected off one or more features at the general location prior to being received at the system. The functions may also include determining a reflected path for the one or more reflected signals, and based at least in part on the reflected path, determining a refined location of the system.

In an additional aspect, a system comprising means for location determination is provided. The system may include means for receiving positioning signals from a plurality of satellites, and means for determining respective angles of reception for the positioning signals. In some implementations, an angle of reception for a given positioning signal is indicative of an orientation of a satellite relative to the system. The systems may further include means for determining a general location of the system, and means for determining topography information for the general location. For instance, the topography information may indicate a given elevation and position for one or more features at the general location. The systems may further include means for identifying, using the topography information and determined respective angles of reception of received positioning signals, one or more of the positioning signals that is a reflected signal. A reflected signal may correspond to a positioning signal that reflected off one or more features at the general location prior to being received at the system. The system may also include means for determining a reflected path for the one or more reflected signals, and based at least in part on the reflected path, means for determining a refined location of the system.

These as well as other aspects, advantages, and alternatives will become apparent to those of ordinary skill in the art by reading the following detailed description, with reference where appropriate to the accompanying drawings.

DETAILED DESCRIPTION

Figure 1:
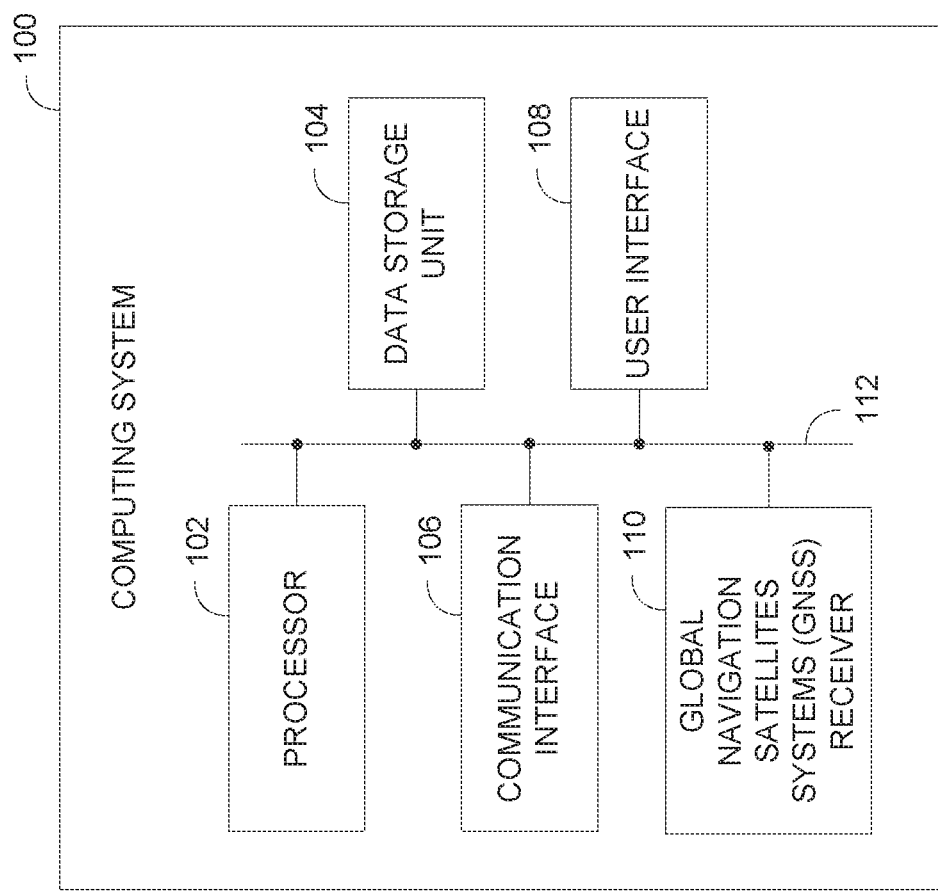
FIG. 1 is a simplified block-diagram of an example computing system.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features.

The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, smartphones, wearable computing devices, and other types of devices often include a receiver configured to use GNSS to perform location determination. Although the receiver can sometimes obtain enough signals from GNSS satellites to enable the receiver or another system to accurately determine the location of the receiver, some situations arise that undesirably impact the accuracy of the location calculations. For instance, when a receiver is positioned in an area with elevated features (e.g., a city with large buildings, elevated landscapes), elevated features can interfere with the reception of positions signals (i.e., signals) from GNSS satellites. In particular, rather than receiving signals directly from the satellites, the receiver may receive one or more signals after the signals reflect off one or multiple features before arriving at the receiver. These reflected signals can negatively impact the accuracy of the subsequent location determination. More specifically, without factoring any extra distance traveled by reflected signals due to the reflections, the location calculations may produce an inaccurate location. In some instances, the degree of inaccuracy can depend on various factors, such as the number of reflected signals used during location calculations as well as the extra distance traveled by the reflected signals due to the interference from elevated features.

Disclosed herein are example methods and systems that can help reduce errors during location determination in areas with elevated features that can potentially interfere with a receiver's ability to receive signal. Particularly, a receiver or associated computing system may identify signals that likely reflected before reaching the receiver and factor extra distances traveled by the signals due to the reflections when using the reflected signals within location calculations. By factoring the extra paths traveled by reflected signals, the location calculations can more accurately determine the location of the receiver despite the interference by elevated features.

As an example, a receiver may initially receive signals from multiple satellites of the GNSS network. Using the received signals, an angle of reception for each signal (or a subset of the signals) may be determined. The angle of reception for a received signal provides information to the receiver or system calculating the location of the receiver. Particularly, the angle of reception can indicate the orientation and/or position of the satellite in orbit relative to the position of the receiver when the satellite transmitted the signal. In some instances, the angle of reception can be determined using information contained within the signal. For example, the information within the signal may specify the position and orientation of the satellite when the signal was received (or transmitted) as well as a time of transmission that specifies when the satellite transmitted the signal. In further examples, the signals received from the satellites and used for determining the location of a receiver can include additional information that can assist performing location determination.

The angles of reception for signals received by a receiver can be used to determine whether any of the signals used for location calculations may have reflected off a building or another feature prior to reaching the receiver. In some instances, the angle of reception for a received signal may indicate that the signal was received from a satellite that was positioned and oriented approximately above the receiver when the signal was transmitted. This angle of reception may indicate that the signal was likely received directly from the satellite without any interference. Particularly, the signal likely avoided interference from any elevated features nearby the receiver since the signal traveled a vertical path from the satellite to the receiver that limits potential interference. As such, signals with angles of reception that indicate the signals were likely received directly without interference can be used to accurately determine the location of the receiver without the need to consider potential extra paths traveled due to interference from elevated features.

In other instances, the angle of reception for a received signal may indicate that the transmitting satellite was likely not positioned approximately above the receiver when the signal was transmitted. Particularly, the angle of reception may indicate that the signals likely encountered interference by one or multiple elevated features before reaching the receiver. The angle of reception may indicate that the signal traveled a sloped pathway (instead of vertical route) before reaching the receiver. As such, when signals with these angles of receptions are used during location calculations, extra paths traveled by the signals due to reflections may impact the accuracy of location determination unless factored within calculations.

In some example implementations, upon receiving enough signals from satellites for trilateration or another location determination process, a preliminary location calculation can be performed to determine a general location of the receiver. The general location gives an approximate location of the receive using location calculations that factor the received signals without further analysis regarding whether or not any of the signals reflected off a building or another feature before reaching the receiver.

In some instances, the general location may not accurately specify the location of the receiver. In particular, the general location may be determined using one or multiple signals that reflected off a feature or multiple features prior to reaching the receiver without analyzing extra distances traveled by the signals. For example, when determining a general location of a receiver within city limits, the determined general location may inaccurately reflect the position of the receiver due to interference from buildings reflecting some of the signals used during calculations. In other instances, however, the general location may correspond to a precise location of the receiver. For example, the general location may accurately reflect the location of the receiver when only directly received signals are used during calculations. An accurate general location is likely to occur in areas with less features that can interfere with signal reception at the receiver.

The general location of a receiver may be used in some examples to obtain further information regarding the area around the receiver, including topography information. For instance, the general location may be used to determine if the receiver is located within a city that includes several large buildings or another location with elevated features. When the general location indicates that the receiver is positioned nearby elevated features, the general location may not accurately depict the precise location of the receiver. Particularly, the elevated features may interfere with the direct reception of signals by the receiver. In some instances, maps (e.g., geographic maps, topography maps) may be used to determine additional information about the general location of the receiver. In some cases, maps or other information about the general location may indicate that signals likely did not encounter interference prior to reaching the receiver. For example, a map of the general location may indicate that the receiver is not positioned near any elevated features.

In further examples, a device associated with the receiver may further include one or multiple sensors that can help determine the surrounding topography of the general location. For instance, the device may utilize radar, LIDAR, or another type of sensor to estimate information regarding nearby features, such as the elevations of features, the distance between the receiver and the features.

After obtaining topography and other possible information for the general location of the receiver, a determination may be made whether to refine the general location or not. Various factors may be considered when determining whether or not to refine the previously determined general location for the receiver. For instance, the receiver or a computing system may analyze factors, such as the surrounding topography nearby the receiver, the angles of receptions of signals used to calculate the general location of the receiver, and the quantity of signals received at the receiver, among other possible factors.

In some examples, some factors may be given more weight compared to other factors. For instance, in some implementations, the angle of reception of each signal used during calculations of the general location may be given more weight than other factors when considering whether or not to recalculate the location of the receiver using equations that factor estimated extra paths traveled by any reflected signals. As such, when one or multiple signals used to determine the general location had an angle of reception that indicates that the signal may have reflected off a feature prior to reaching the receiver, the receiver or system may attempt to refine the general location using new signals and potentially factoring extra distances traveled by any of the signals due to reflections.

As indicated above, the general location of the receiver may be refined in some situations. In some examples, refining the general location may involve obtaining new signals and calculating an updated location of the receiver. This updated location may be calculated without estimating and factoring potential extra paths traveled by any signals that likely reflected prior to reaching the receiver. As such, the updated location may be compared to the general location, which may involve factoring other sensor information (e.g., accelerometer) if the receiver is non-stationary between the calculation of the general location and the updated location.

In other examples, refining the general location may involve obtaining new signals and estimating the extra paths traveled by signals that may have reflected off one or multiple features before reaching the receiver. The estimated extra path represents the extra distance traveled prior to reaching the receiver due to a reflection off one or more features and can influence the accuracy of location calculations. As such, by including the extra distance traveled within location calculations, location determination is more likely to reflect the location of the receiver accurately.

In some examples, the receiver or computing system may estimate the distance between the receiver and the side of the feature that reflected the signal and use the estimated distance to further estimate the extra distance traveled the reflected signal. As such, various techniques can be used to estimate the distance between a receiver and a feature or features (e.g., buildings) that likely reflected a signal used for location calculations. For instance, the receiver may determine the distance between the receiver and the reflecting feature using a map, sensor data, topography information, or other information. In further examples, the receiver may use a combination of techniques to estimate the distance between the receiver and a feature that reflected a signal.

In further examples, the receiver may also predict or anticipate the elevation of the point on the feature where a signal likely reflected off before reaching the receiver. This way, the receiver can use the elevation of the reflection point when determining the extra path traveled by the reflected signals. For example, the receiver may use its distance from the reflecting side of the feature, the elevation of the potential reflection point on the feature, and/or the angle at which the signal was received at the receiver to estimate the extra path traveled by the signal due to the reflection. In other examples, the receiver may determine the extra path traveled by a reflected signal in other ways, which may include factoring the angle of reception.

As indicated above, a receiver may use estimated extra paths of travel for reflected signals to calculate a refined location of the receiver. For instance, the receiver may factor the extra path of travel into standard location determination calculations, which can result in a more accurate location of the receiver compared to the previously determined general location. The extra path of travel may be included in location calculations to enable all the extra path lengths and the receiver position to be computed simultaneously using a set of equations.

In a further implementation, the receiver may determine that its determined general location represents an accurate location of the receiver. For example, the receiver may analyze topography information and/or angles of reception for received signals and determine that there are no features at the general location that may have interfered with signal reception. In particular, the receiver may determine that enough signals were received directly from satellites to determine an accurate location without using any reflected signals. In such examples, the receiver may refrain from attempting to identify any reflected signals to further refine the location determination. Rather, the general location may represent an accurate location of the receiver.

In some cases, the receiver may determine that a signal used to perform location determination likely bounced off multiple features prior to reaching the receiver. For instance, the signal may reflect off a first building and also reflect off a second building prior to reaching the receiver. In such a scenario, the receiver may determine the extra paths traveled by the reflected signal due to the multiple reflections by different features and factor the extra paths when determining its location.

Systems, methods, and devices in which examples may be implemented will now be described in greater detail. In general, described methods may be implemented by various types of computing devices or components of the devices. In one example, a system may include one or more servers, which may receive information from and provide information to a device, such as a mobile phone. However, the described methods may also be implemented by other computing devices, such as a personal computer, a wearable computing device, stand-alone receiver, or a mobile device, among others.

Further, an example system may take the form of a computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

Referring now to the figures, FIG. 1 is a simplified block-diagram of an example computing system 100 that can perform various acts and/or functions, such as those described in this disclosure. Computing system 100 may correspond to any type of device, such as a smartphone, portable computer, or wearable computing device, etc., and can include various components, such as processor 102, data storage unit 104, communication interface 106, user interface 108, and/or GNSS receiver 110.

These components as well as other possible components can connect to each other (or to another device, system, or other entity) via connection mechanism 112, which represents a mechanism that facilitates communication between two or more devices, systems, or other entities. As such, connection mechanism 112 can be a simple mechanism, such as a cable or system bus, or a relatively complex mechanism, such as a packet-based communication network (e.g., the Internet). In some instances, a connection mechanism can include a non-tangible medium (e.g., where the connection is wireless).

In a further implementation, computing system 100 can include more or fewer components and may correspond to a standalone receiver configured to perform location determination processes described herein.

Processor 102 may correspond to a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Computing system 100 can be configured to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. In an example, communication interface 106 can be a wired interface, such as an Ethernet interface or a high-definition serial-digital-interface (HD-SDI). In another example, communication interface 106 can be a wireless interface, such as a cellular or WI-FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 108 can facilitate interaction between computing system 100 and a user of computing system 100, if applicable. As such, user interface 208 can include input components such as a keyboard, a keypad, a mouse, a touch sensitive panel, a microphone, and/or a camera, and/or output components such as a display device (which, for example, can be combined with a touch sensitive panel), a sound speaker, and/or a haptic feedback system. More generally, user interface 108 can include hardware and/or software components that facilitate interaction between computing system 100 and the user of the computing device system.

GNSS receiver 110 represents a component that computing system 100 may include for location determination processes. GNSS receiver 110 may correspond to various types of receivers that may perform GNSS locations. For instance, GNSS receiver 110 may receive signals from satellites to use to perform location determination processes. As such, GNSS receiver 110 may operate using assistance from one or more processors 102, a power supply, and various interfaces, such as a display interfaced and audio interface.

In some instances, GNSS receiver 110 may perform trilateration, and/or other processes to determine the location of computing system 100. Trilateration is similar to identifying a location on a map knowing the precise distance from three different landmarks using a pair of compasses, where the location may correspond to the point that the three circles centered on each of the landmarks overlap given that the radius of each circle corresponds to the distance from each landmark. In practice, a location using GNSS is performed using trilateration as implemented with a set of simultaneous equations, where each equation describes the distance to one particular satellite as a function of the receiver location. In most instances there will be four or more simultaneous equations.

GNSS receiver 110 may be configured to determine the location and/or other information (e.g., direction, speed) regarding computing system 100. For instance, GNSS receiver 110 may enable computing system 100 or applications on computing system 100 to quickly to access and use location, speed, and direction information. In general, location may be determined in three dimensions, including altitude. GNSS receiver 110 may be configured to supplement location determination with information received via Bluetooth or Wi-Fi signals.

As indicated above, connection mechanism 112 may connect components of computing system 100. Connection mechanism 112 is illustrated as a wired connection, but wireless connections may also be used in some implementations. For example, the communication link 112 may be a wired serial bus such as a universal serial bus or a parallel bus. A wired connection may be a proprietary connection as well. Likewise, the communication link 112 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

Figure 2:
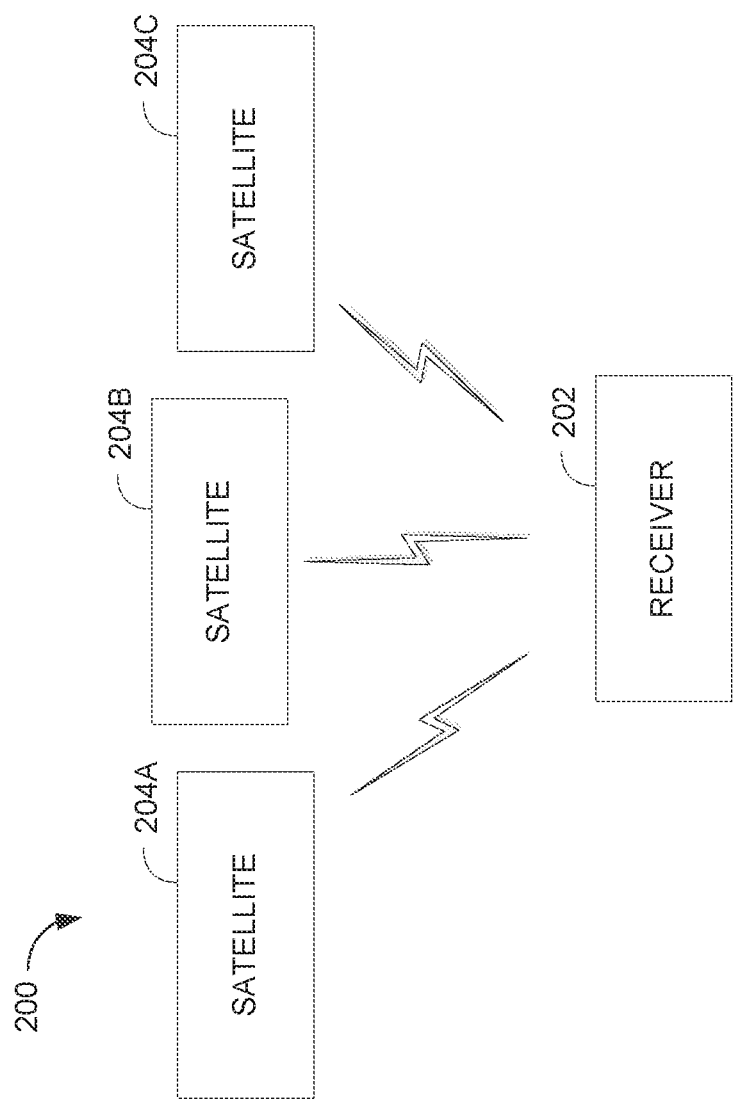
FIG. 2 illustrates an example scenario showing a receiver performing location determination using signals from a set of satellites.

FIG. 2 illustrates example scenario 200 showing receiver 202 performing location determination using signals from a set of satellites. In particular, scenario 200 represents a general situation showing how receiver 202 may receive and use signals from multiple satellites (satellite 204A, satellite 204B, and satellite 204C) for location determination. Within other implementations, scenario 200 may involve more or fewer satellites and/or receivers. For example, in some instances, receiver 202 may use signals from four different satellites to perform location determination and to check accuracy of that determination.

As shown, receiver 202 is receiving signals from a set of satellites (satellite 204A, satellite 204B, and satellite 204C). Receiver 202 may correspond to computing system 100 and/or another device with more or fewer components. For example, receiver 202 may correspond to a smartphone, wearable computing device, or a vehicle GNSS system, among other possible devices.

Satellites 204A-204C as well as other satellites in the GNSS network may orbit Earth and periodically transmit signals having information that receivers may use for location determination. Each transmitted signal may include information that assists receivers perform location determination, such as an indication of the time that the satellite transmitted the signal towards the surface of Earth based on the satellite's atomic clock. A transmitted signal may also provide other information, such as an indication of the relationship between the satellite's clock and GPS time, or the reference time of other GNSS, and precise orbit information that helps the receiver determine a position of the transmitting satellite. As such, receiver 202 as well as other receivers may receive and use the periodically transmitted signals from the set of satellites to determine location and/or other possible information, such as speed. Reception of signals from multiple satellites (e.g., four satellites) may enable a receiver to perform location determination processes, such as the trilateration calculations described above.

In some instances, one or more signals received at receiver 202 may have reflected off one or more features, such as building or other mechanical structures prior to reaching receiver 202. For example, receiver 202 may have a position in a city that includes multiple large buildings that may reflect signals from satellites 204A-204C when receiver 202 is positioned nearby the buildings. As such, receiver 202 may perform processes described herein to determine an accurate location that may factor the extra paths traveled by one or more signals due to reflections.

Overall, receiver 202 may receive signals in various ways, such as some signals directly from the transmitting satellites and some signals after the signals reflect off one or more features positioned in the general location of receiver 202. Additionally, although not shown in FIG. 2, receiver 202 may also fail to receive some signals from a given satellite due to one or more features completely blocking all paths between the given satellite and receiver 202.

Figure 3:
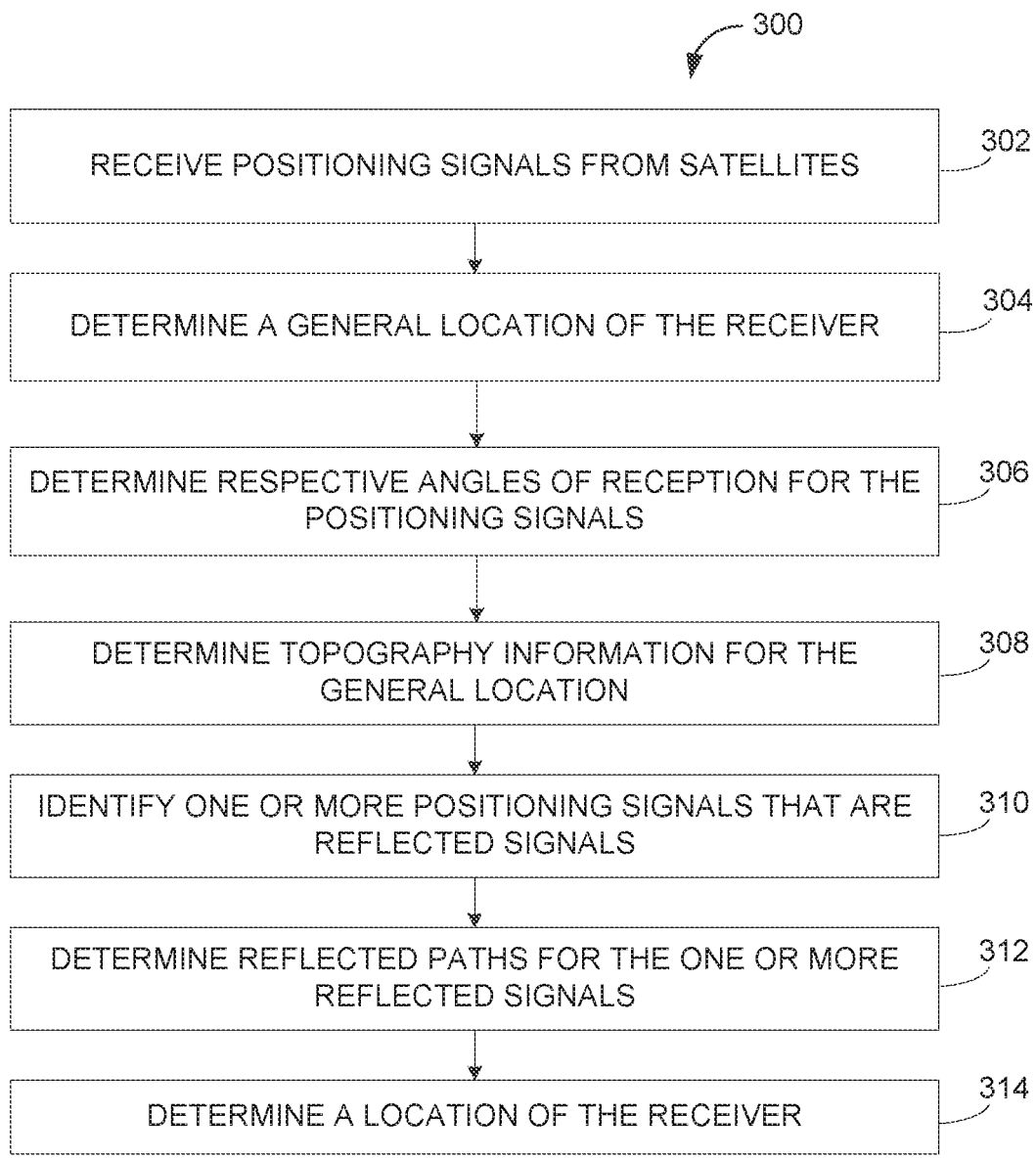
FIG. 3 is a flowchart that shows an example method for location determination.

FIG. 3 is a flow chart of a method 300 for location determination. Method 300 may include one or more operations, functions, or actions as illustrated by one or more of blocks 302, 304, 306, 308, 310, 312, and 314. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, a tangible storage device, or other article of manufacture, for example.

Furthermore, for method 300 and other processes and methods disclosed herein, each block in FIG. 3 may represent circuitry that is wired to perform the specific logical functions in the process.

At block 302, method 300 may include receiving positioning signals from satellites. As discussed above, a receiver (e.g., receiver 202) may receive signals for location determination from multiple satellites operating in the GNSS network. The receiver may use the signals from multiple satellites to determine its location and/or other information, such as speed of the receiver. Information within each signal can also assist in location determination.

In some implementations, the receiver may use an indication of the time at which the satellite transmitted the signal according to the satellite's clock and orbit information that describes a position of the satellite relative to the receiver when performing location calculations. In some examples, the receiver may receive signals from at least four satellites to enable trilateration determination.

At block 304, method 300 may include determining a general location of the receiver. For example, the receiver may use signals from multiple satellites to determine its location and other information (e.g., speed, direction) using various techniques, such as trilateration calculations. The receiver may also use other processes to determine its location. For instance, the receiver may determine its position using information from a network-based location system (e.g., LTE, Wi-Fi Network).

In some examples, the receiver may estimate its position based on one or more recent positions of the receiver. For instance, the receiver may continuously update its position based on movement of the receiver and prior determined locations. The receiver may use a combination of sensor measurements (e.g., accelerometers, rate gyroscopes, magnetometers, pressure sensors, etc) along with new sets of signals to determine changes in its position. As such, the receiver may use dead reckoning to determine its position, which can involve measuring triaxis acceleration and triaxis angular velocities in order to estimate the position of the receiver. The receiver may use other techniques to determine its position within examples, including a combination of the above processes.

In some implementations, the receiver may determine a general location that corresponds to an accurate location of the receiver. For example, when a receiver is able to receive enough signals directly from multiple transmitting satellites without interference, the receiver may determine a general location that accurately represents the location of the receiver.

In some instances, however, one or more features positioned nearby the receiver may interfere with the direct reception of signals by the receiver. For instance, the receiver may receive one or more signals that reflect off one or more features (e.g., a large building) prior to reaching the receiver. Further, some signals may be completely blocked by features and not even reach the receiver. As a result, in some instances, the receiver may determine a general location that fails to indicate a precise location of the receiver. Rather, the general location may give an approximation of the receiver that is not precise. The receiver may fail to determine a precise location due to a failure to factor the extra paths traveled by one or more reflected signals during location calculations.

In some examples, the receiver may be configured to determine a general location of the receiver that represents an area that likely includes the current position of the receiver. In other words, the receiver may be configured to determine a general location that includes a buffer zone to ensure that the receiver is likely within the general location. For example, the receiver may be configured to determine buffer-sized general location when the receiver first determines that its location is in an area with many elevated features. With this configuration, the receiver may be configured to further refine the general location by identifying the extra paths traveled by any reflected signals used during location calculations and/or other potential techniques.

At block 306, method 300 may include determining respective angles of reception for the positioning signals. As indicated above, the angle of reception for a received signal may indicate the position and orientation of the transmitting satellite within orbit relative to the receiver. For example, an angle of reception can specify that the transmitting satellite was positioned in orbit roughly above the receiver or that the transmitting satellite was at a distant orientation in its orbit such that signals arrived at the receiver at sloped angles. In some instances, an angle of reception for a signal may indicate that the transmitting satellite was positioned in orbit in front or behind the receiver when it transmitted the signal.

In some implementations, the receiver may use information within a received signal to determine the angle of reception that indicates the orientation of the satellite relative to the receiver. For example, the receiver may use information within one or more signals that indicates the satellite's position in orbit of the satellite when determining the angle of reception for those signals. In some examples, the receiver may also use its location along with the location of the transmitting satellite to determine an angle of reception for signals from that satellite. The receiver may compare its location and the position of the satellite relative to the receiver to determine the angle of reception for a signal.

In further implementations, the receiver may determine the angle of reception for the received position signal also based on a respective elevation and position of one or more features positioned proximate the receiver. For instance, the receiver may analyze topography information (e.g., elevation maps) to determine whether a feature, such as a building or another large structure, would potentially prevent some signals from reaching the receiver from the satellite directly.

At block 308, method 300 may include determining topography information for the general location. In some implementations, the topography information may indicate the elevations and positions for one or more features in the general location. As indicated above, a feature may correspond to an elevated entity positioned at the general location, such as mechanical structures (e.g., buildings, bridges) or natural landforms (e.g., mountains, hills).

In some instances, the receiver may obtain topography information for the general location to have information available during location determination that indicates the heights and positions of features positioned nearby the receiver. For instance, the topography information may indicate the approximate height and location of buildings positioned within a threshold distance (e.g., 1,000 feet) from the receiver. In some implementations, the threshold distance from the receiver may vary depending on the quantity of features in the general location and/or other possible factors.

Within implementations, a receiver may determine topography information for the general location in various ways. For instance, the receiver may access one or more maps that include the topography information (e.g., elevation maps, city maps). In an example implementation, the receiver may transmit a request that includes an indication of its general location to a system that may send topography information (e.g., maps) to the receiver based on the general location. The receiver may share topography information with other devices (e.g., other receivers) via a cloud database, for example.

In a further implementation, the receiver may develop topography information using one or more sensors. For instance, the receiver may use cameras and/or other possible sensors to develop topography information for the general location of the receiver. A receiver may also use a combination of sources (e.g., maps, sensors) to obtain topography information for the general location. For example, the receiver may use previously determined maps to determine the elevation and position of features (e.g., buildings), but may also use sensors (e.g., cameras) to estimate distances between the receiver and one or more features.

In some implementations, the receiver may determine its position relative to features as indicated within the topography information for the general location. For example, the receiver may determine its distance from multiple features that potentially may block and/or reflect incoming signals from satellites.

At block 310, method 300 may include identifying one or more of the positioning signals that are reflected signals. As indicated above, a receiver's location determination may produce a significantly inaccurate location when the receiver uses one or more signals that reflected off a feature (e.g., a building) prior to reaching the receiver unless the receiver factors the extra paths traveled by reflected signal within location calculations. Thus, in order to accurately determine its location in areas with many elevated features, a receiver may sometimes identify signals that likely correspond to reflected signals so that the extra distance traveled by the reflected signals may be used during location determination.

In some implementations, a receiver may analyze topography information at its general location to determine whether or not any signals may have been potential reflected prior to being received. For instance, the receiver may determine that its general location lacks any large features that may interfere with signal reception and refrain from attempting to identify potentially reflected signals.

In other situations, the receiver may determine that its general location includes features that may have potentially interfered with signal reception and proceed to identify received signals that likely correspond to reflected signals. In a further implementation, the receiver may automatically analyze received signals to identify signals that potentially correspond to reflected signals regardless of the topography of the area.

In some implementations, a receiver may identify a received signal is likely a reflected signal based on the signal's angle of reception. For instance, the receiver may determine that signals received to form angles with the surface below the receiver within a certain range likely correspond to reflected signals that reflected off a feature prior to reaching the receiver. The receiver may determine that signals received in a manner that forms slightly acute or obtuse angles with the surface below the receiver likely correspond to reflected signals. Particularly, the receiver may have a position in a general location with lots of features that would likely either block or reflect signals that are received at the receiver at certain angles.

In some instances, the receiver may determine satellite positions approximately above the receiver result in signals that likely do not correspond to reflected signals. Rather, the signals likely correspond to directly received signals since the receiver received the signals at such angles.

In a further implementation, a receiver may identify that a signal corresponds to a reflected signal based on a combination of information. For instance, the receiver may use topography information for the general location of the receiver, the approximate location of the receiver, and the location of the satellite, to identify one or more received signals that likely correspond to reflected signals.

The receiver may use the position and heights of buildings and/or other features in the general location to assist in identifying signals that may be reflected signals. For example, the receiver may use general area's topography information and position of the receiver and satellite to identifying any signals that likely have a direct path that is blocked, and therefore these signals must have been reflected off one or more features prior to reaching the receiver.

At block 312, method 300 may include determining reflected paths for the one or more reflected signals. In order to improve location determination, a receiver may factor the extra path traveled by a reflected signal within location calculations. As such, the receiver may use various techniques to determine the extra path traveled by a reflected signal.

In some implementations, the receiver may determine the extra paths traveled based on the geometrical relationship between the reflected path and the (as yet unknown) distance of the receiver from the reflecting surface. For example, in order to determine extra paths traveled by received reflections, the receiver may solve a set of equations that factor the general location of the receiver, the position and elevation of features nearby the receiver, the positions of transmitting satellites, and/or previously determined angles of reception. In some examples, determining the reflected path for the one or more reflected signals is based on computing a reflection of one or more satellite positions.

At block 314, method 300 may include determining a refined location of the receiver. After determining the geometrical relationship between the extra path traveled by one or more reflected signals, and the receiver location relative to the reflecting surfaces, the receiver may solve a set of simultaneous equations that simultaneously compute the extra path distances and the location of the receiver. As such, the receiver may determine a more accurate (i.e., a refined location) by factoring the extra path traveled by reflected signals during location determination.

In an example implementation, the receiver may use multiple directly received signals (i.e., signals that did not reflect off one or more features prior to reaching the receiver) and one or more reflected signals. In particular, the receiver may take into account the extra time and/or path that a reflected signal traveled when performing trilateration calculations using the reflected signal and other directly received signals.

In another implementation, the receiver may remove any reflected signals and use only directly received signals for determining a refined location of the receiver. In this example, the receiver may determine that enough signals were received directly from multiple satellites, with a good enough geometry, to compute an accurate location of the receiver. For instance, the receiver may have a location in an area with minimal features that may prevent direct reception of signals from the satellites. As a result of determining that the receiver has enough directly received signals, the receiver may determine a precise location of the receiver using the direct signals. Similarly, in some implementations, the receiver may only use one or more reflected signals to determine its location when the receiver needs to use the reflected signal(s). For instance, the receiver may receive only one or two signals directly requiring the receiver to use at least one reflected signal.

In another implementation, the receiver may obtain a set of signals that traveled reflected paths. Yet it may still determine, simultaneously, its accurate location and the extra path lengths for each of the reflected paths. It does this by determining the geometrical relationship between the extra path lengths and the receiver location relative to each of the reflecting surfaces. Then using this relationship in a set of simultaneous equations.

In a further implementation, the receiver may obtain information from one or more other receivers positioned nearby the receiver to supplement its location determination. For instance, the receiver may transmit a request to one or more other devices, such as other receivers or network entities requesting location information that may supplement the receiver's location determination calculations. In another implementation, the receiver may use one or more sensors to supplement its location determination. For example, the receiver may use inertial measurement sensors while determining its location.

Figure 4A:
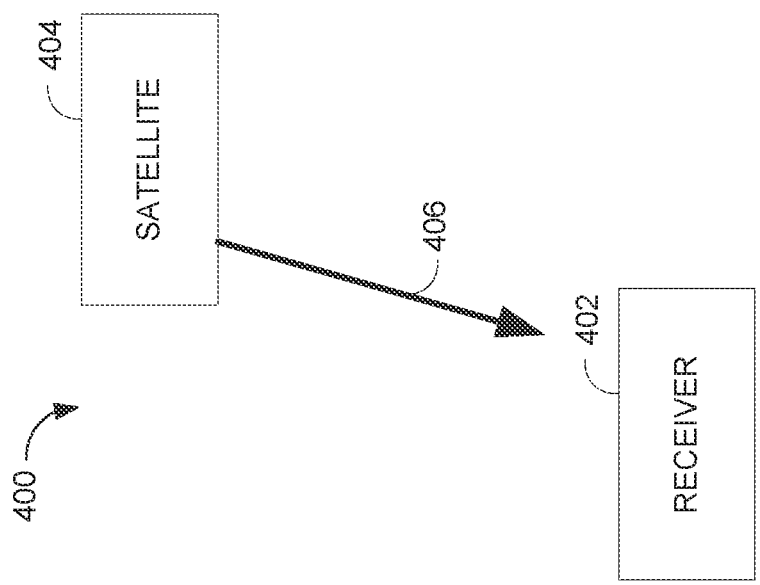
FIG. 4A illustrates an example scenario showing a receiver receiving a signal directly from a satellite.

FIG. 4A illustrates example scenario 400 showing receiver 402 receiving signal 406 directly from satellite 404. As discussed above, in some situations, a receiver may have a location that enables the receiver to receive signals for location determination from satellites without interference from any elevated features. For example, a receiver positioned in an open area without any tall structures can often receive enough signals to perform accurate location determination.

As shown in scenario 400, receiver 402 is receiving signal 406 directly from satellite 404 without any interference. As a result, signal 406 can be used for location determination without estimating and factoring any extra path traveled due to reflections. When receiving signal 406 or after completing the reception of signal 406, receiver 402 may determine an angle of reception for signal 406 based on information within the signal as well as other potential factors. The angle of reception can specify the position and orientation of the transmitting satellite within its orbit relative to the position of the receiver within an environment.

In some embodiments, receiver 402 may use its approximate location and topography information for the location in addition to the position and orientation of satellite 404 to determine that signal 406 was received without interference. Receiver 402 may analyze the angle of reception as well as other potential information to determine whether one or more features have positions that may interfere with the direct reception of signals from satellites. Directly received signals, such as signal 406 can be used to determine a precise location of receiver 402.

Figure 4B:
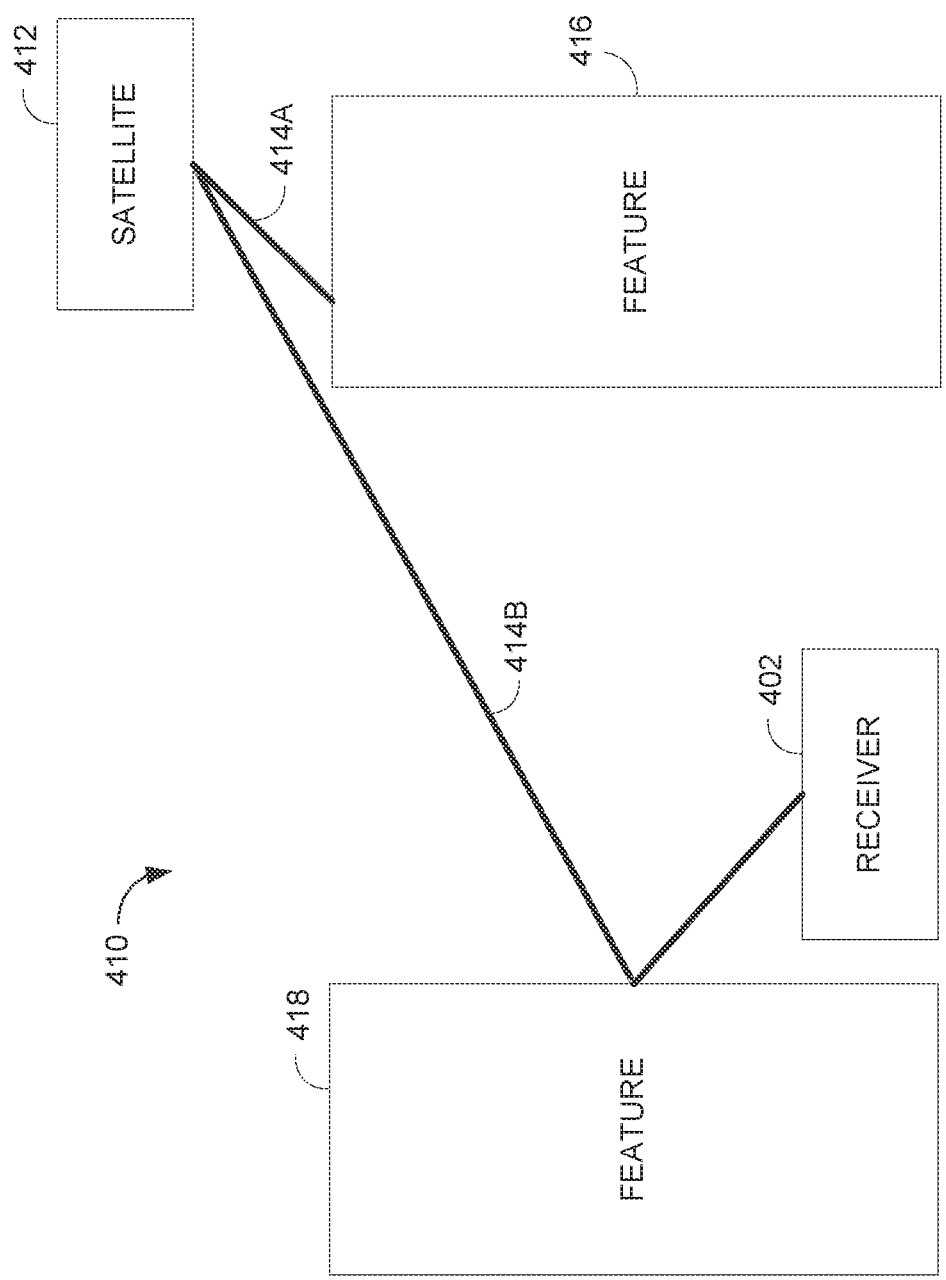
FIG. 4B illustrates an example scenario showing a receiver receiving a reflection of a signal after failing to receive a signal directly from the satellite.

FIG. 4B illustrates example scenario 410 showing receiver 402 receiving reflected signal 414B after failing to receive signal 414A directly from satellite 412. In some situations, receivers may attempt to perform location determination in areas with features that might interfere with signal reception. For instance, a receiver in an urban setting may encounter interference with signal reception due to large buildings that can block or reflect signals prior to the signals reaching the receiver.

Scenario 410 shows a situation where receiver 402 is blocked from receiving signal 414A directly from satellite 412 due to the presence of feature 416. In particular, feature 416 may represent a large building or another type of structure that can prevent receiver 402 and other receivers positioned nearby feature 416 from receiving signals from one or more transmitting satellites. As shown, feature 416 is positioned in a manner that completely blocks the path of signal 414A transmitted by satellite 412 from its orientation and position in orbit relative to receiver 402.

Although receiver 402 is shown unable to receive signal 414A directly from satellite 412, receiver 402 may still receive and use signals from satellite 412 for location determination. As further shown in scenario 410, receiver 402 may receive reflected signal 414B after signal 414B reflects off feature 418. Upon receiving signal 414B, receiver 402 may identify that signal 414B likely corresponds to a reflection based on various factors, such as the position and orientation of satellite 412 relative to receiver 402, topography information, and the position of receiver 402 relative to satellite 412. For instance, receiver 402 may use the topography information and position and orientation of satellite 412 to determine that feature 416 has a position relative to receiver 402 and an overall elevation that causes feature 416 to prevent receiver 402 from receiving signal 414A directly from satellite 412. This analysis may further assist receiver 402 determine that signal 414B is likely a reflection based on the positioning of receiver 402 relative to feature 418 and the general position of satellite 412.

Figure 5A:
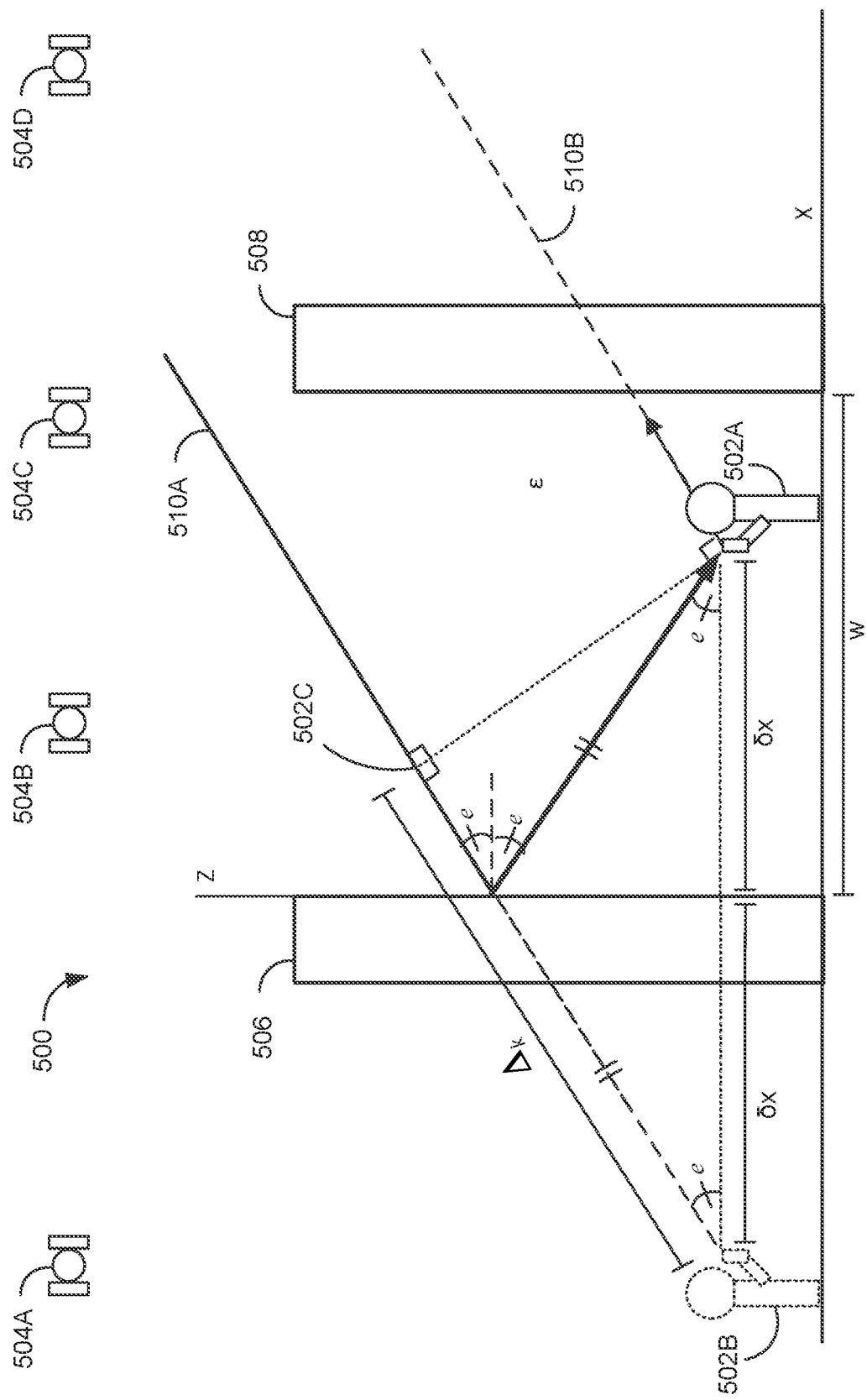
FIG. 5A illustrates an example scenario showing a receiver performing location determination.

FIG. 5A illustrates example scenario 500 showing receiver 502A performing location determination. Particularly, scenario 500 depicts receiver 502A performing location calculations using signals received from a set of satellites (satellite 504A, satellite 504B, satellite 504C, and satellite 504D). As discussed above, in order to determine an accurate location of receiver 502A, receiver 502A or an associated computing system may solve a set of equations simultaneously (or in a series of calculations) using signals received from satellites. In some instances, these equations may enable factoring extra paths traveled by reflected signals (e.g., reflected signal 510A) caused by interference to ensure precise location determination for receiver 502A.

Scenario 500 depicts an example situation where the location of receiver 502A may be determined accurately despite using one or more reflected signals. As shown, scenario 500 includes receiver 502A positioned between feature 506 and feature 508, which can represent any type of structures that can interfere with signal reception. For example, features 506-508 may be large buildings, other elevated mechanical structures or land-based features that can block or interfere with the direct reception of signals transmitted by satellites. As such, scenario 500 represents an example implementation involving estimating and using extra paths traveled by one or multiple reflection signals during location calculations to improve results. Other example scenarios are possible.

Satellites 504A-504D are depicted in FIG. 5A at different positions and orientations relative to receiver 502A. The different positions and orientations of satellites 504A-504D help illustrate the different paths that signals may travel prior to reaching receiver 502A for location calculations. Although satellite 504D is shown as the only satellite transmitting a visible signal (i.e., signal 510A, signal 510B), receiver 502A may also receive signals (not shown) from satellites 504A-504C and use the signals to perform location calculations. The transmission paths of signals 510A-510B are shown in FIG. 5A to represent how receiver 502A may receive a signal from a given satellite (e.g., satellite 504D) after the signal reflects off a feature (e.g., feature 506) and still use the reflected signal to accurately determine location despite the interference and extra path traveled due to the reflection.

Focusing on the satellites individually, the orientation of satellite 504A relative to receiver 502A represents a non-line-of-sight on the left (NLOS-L) orientation. A satellite has a non-line-of-sight (NLOS) orientation relative to a receiver when the satellite is unable to transmit signals directly to the receiver without encountering interference from one or more buildings or other elevated features. For example, satellite 412 shown in FIG. 4B also has a NLOS orientation relative to receiver 402 because satellite 412 is unable to directly transmit signal 414A to receiver 402 without interference from feature 416 (i.e., feature 416 blocks the direct transmission path between receiver 402 and satellite 412). Despite the interference, receiver 402 may still receive a signal (e.g., signal 414B) indirectly from satellite 412 after signal 414B reflected off feature 418.

Referring back to FIG. 5A, satellite 504A is positioned at a NLOS-L orientation relative to receiver 502A since satellite 504A is oriented to the left of receiver 502A and satellite 504A is unable to transmit signals directly to receiver 502A due to the presence of feature 506 blocking the transmission path. Receiver 502A, however, may still be able to receive and use indirect signals from satellite 504A in its current location after the signals reflect off a feature (e.g., feature 508) towards receiver 502A (not shown in FIG. 5).

Satellite 504B and satellite 504C, unlike satellite 504A, have a clear line-of-sight (LOS) for transmitting signals to receiver 502A. A satellite is in a LOS orientation relative to a receiver when the satellite can transmit signals directly to the receiver without interference from one or more features (e.g., buildings). As shown in scenario 500, satellite 504B and satellite 504C are orientation relative to receiver 502A such that each satellite can send signals directly to receiver 502A without interference from feature 506 or feature 508. A receiver may use signals from satellites positioned in a LOS orientation in location calculations without having to consider any extra paths. For example, during location calculations, receiver 502A may use various factors, such as the general location, signals and information from satellites 504B, 504C, topography information for the area, and other potential factors (e.g., angles of reception) to determine that signals received from satellite 504 are direct signals. As result, receiver 502A may use signals received from satellite 504B and satellite 504C and/or other satellites positioned at LOS orientations to calculate location without factoring any extra paths for the signals since the signals did not reflect off a feature prior to reaching receiver 502A (as indicated by the angle of reception for these signals).

Similar to satellite 504A, satellite 504D also has an NLOS orientation relative to receiver 502A. In particular, satellite 504D has a NLOS-R orientation since satellite 504D is oriented to the right of receiver 502A and unable to directly transmit signals to receiver 502A as illustrated by the path of signal 510B. However, although receiver 502A is unable to receive signals (e.g., signal 510B) directly from satellite 504D due to interference from feature 508, receiver 502A may still receive signals indirectly from satellite 504D, such as signal 510A that reflected off feature 506 prior to reaching receiver 502A. In order to use reflected signal 510A in location calculations without impacting the accuracy of the calculated location, receiver 502A may factor the extra path traveled by signal 510A within the calculations. Prior to factoring the extra path, various factors may indicate that signal 510A reflected prior to reaching receiver 502A, such as the angle of reception of signal 510A, signal information within signals received from satellite 504D, and/or topography information to determine that signal 510A is likely a reflection.

As indicated above, receiver 502A may use signals from multiple satellites to calculate location. In some situations (e.g., scenario 500), receiver 502A may determine that one or multiple signals used for location calculations likely reflected off a feature prior to reaching receiver 502A. Accordingly, receiver 502A or another system may identify signals that likely correspond to reflections using various factors, such as a previously determined general location of receiver 502A (or a prior location determined for receiver 502A), the locations of transmitting satellites relative to receiver 502A as well as information within the signals, angles of reception for each signal, and/or topography information for the location. As an example, receiver 502A may determine that nearby features as indicated in topography information may potentially interfere with signal reception when identifying signals that likely correspond to reflections in order to determine the extra paths traveled due to the reflections.

In order to factor extra paths traveled by reflected signals within location calculations, the extra paths may need to be estimated. The following description illustrates how the extra paths may be estimated and used within location calculations. Other examples of estimating and factoring extra paths for reflected signals received at a receiver are possible.

As shown in FIG. 5A, receiver 502A is positioned at distance δx away from the side of feature 506. Feature 506 represents a physical structure that reflected signal 510A towards receiver 502A. FIG. 5A also shows an outline of receiver 502B, which represents where a receiver would receive signal 510A if signal 510A traveled a straight, non-reflected route. As such, receiver 502B is also positioned at distance ix away from the reflecting side of feature 506 making the distance between receiver 502A and receiver 502B equal to distance 2δx. In some examples, receiver 502A may estimate and use distance δx and/or distance 2δx when determining the extra paths traveled by reflected signals that originate from satellite 504D and other satellites oriented at NLOS-R relative to receiver 502A since the reflected signals reflected off feature 506. For example, receiver 502A may use sensors, location measurements, or other factors when estimating distance δx from feature 506.

As further shown in FIG. 5A, receiver 502A is also positioned proximate to feature 508. In particular, the nearest side of feature 508 is positioned at distance (w-δx) from receiver 502A, where distance w represents the distance between feature 506 and feature 508 and distance δx represents the distance between receiver 502A and the side of feature 506 as discussed above. As such, in some examples, receiver 502A may estimate the distance (w-δx) from feature 508 in order to determine the extra paths traveled by signals originating from satellite 504A or other satellites having an NLOS-L orientation relative to receiver 502A since the signals reflect off the side of feature 508 prior to reaching receiver 502A (not shown). Receiver 502A may use sensors, prior location calculations, maps, or other information to determine distance (w-δx). For illustration purposes, scenario 500 shows both the reflected path of signal 510A and blocked path of signal 510B to represent how receiver 502A may still receive and use reflected signal 510A from satellite 504D despite failing to receive signal 510B directly from satellite 504A due to the presence of feature 508. Scenario 500 represents an example situation that can occur often within cities that have large buildings.

In order to accurately determine its location using one or more reflected signals, receiver 502A may perform a set of location calculations simultaneously (or in a series of calculations). Particularly, during location calculations, receiver 502A may determine four initially unknown states, such as the location of receiver 502A in three dimensions (X,Y,Z), and the clock offset of receiver 502A. In order to determine the four initially unknown states, receiver 502A may use a multivariable equation (e.g., equation [1]) that relates the states to measurements. In equation [1], $\delta_z$ corresponds to a vector of measurement residuals, each element k of this vector contains the difference between the measured range to satellite k, and the expected range to that satellite if the receiver's state were [0;0;0;0]. H corresponds to a matrix that maps the measurement residuals to the states as shown in equation [2], where $\underline{e}_k$ represents the unit vector from the receiver 502A to satellite k, and $\delta_{\underline{x}}$ represents changes in the three dimensions and clock offset as shown in equation [3].

$$\delta_{\underline{z}} = H\delta_{\underline{x}} \qquad [1]$$

$$H = \begin{bmatrix} -\underline{e}_1, & 1 \\ \vdots & \vdots \\ -\underline{e}_K, & 1 \end{bmatrix} \qquad [2]$$

$$\delta_{\underline{x}} = \begin{bmatrix} \delta x \\ \delta y \\ \delta z \\ \delta_b \end{bmatrix} \qquad [3]$$

Receiver 502A may generally use equation [1] to calculate location using signals from four or more satellites. However, as shown in scenario 500, one or more features (e.g., features 506-508) may interfere with the reception of signals and can cause receiver 502A to receive and potentially use one or more reflected signals (e.g., signal 510A). Using a reflected signal or reflected signals can produce inaccurate location results. Therefore, to avoid inaccurate results, receiver 502A may use a modified form of equation [1] that can factor extra paths traveled by reflected signals (e.g., signal 510A) as shown in equation [4], $$\delta z_k = H_k \cdot \delta \underline{x} + \Delta_k \qquad [4]$$

Equation [4] contains one row of the modified equation [1]. Equation [4] represents an example modification. As such, other lines of the above equations can have similar modifications in an analogous way. As such, the value $\Delta_k$ in equation [4] represents the extra path length that signal 510A traveled as a result of the reflection when compared to signal 510B. The next step represents $\Delta_k$ in terms of the unknown receiver states x. This step can be done by analyzing the triangle shown in FIG. 5A formed between positions of receiver 502A, receiver 502B, and point 502C.

As shown, the triangle includes a right angle with hypotenuse 2δx, and base $\Delta_k$, with contained angle e. As a result, equation [5] can be formed. FIG. 5A further depicts all the angles labeled e in FIG. 5 as having the same value since the angle of incidence of a ray equals the angle of reflection, alternate angles, and corresponding angles.

Receiver 502A may use equation [5] to determine the extra path traveled $\Delta_k$ for reflected signal 510A by multiplying the distance 2δx that receiver 502A is positioned from feature 506 by the cosine of angle e (i.e., the angle of reception of signal 510A). As such, equation [5] may be used to determine the additional path traveled $\Delta_k$ when the reflected signal originates from a NLOS-R satellite, such as signal 510A transmitted by satellite 504D.

$$\Delta_k = 2\delta x \cos(e) \qquad [5]$$

Conversely, equation [6] represents an example calculation for determining the extra path traveled by a reflected signal that originates from a NLOS-L satellite (e.g., satellite 504A). As shown, equation [6] is similar to equation [5], but uses the distance of receiver 502A from feature 508 since the side of feature 508 would cause the reflection of the signal that is sent by the NLOS-L satellite.

$$\Delta_k = 2(w-\delta x)\cos(e) \qquad [6]$$

Note that the specific values of $\Delta_k$ and e for equation [6] and satellite 504A are not shown in FIG. 5A, but could be drawn in an analogous way to the reflected path from satellite 504D. As such, $\Delta_k$ is expressed in terms of the unknown receiver position δx. Accordingly, in some implementations, the following guidelines may be used during location calculations: if the satellite has a line-of-sight (LOS) signal, then $\Delta_k=0$; if the satellite has a non-line-of-sight signal from the right (NLOS-R) then $\Delta_k$ is given by equation [5], if the satellite signal is NLOS-L, then $\Delta_k$ is given by equation [6]. The value of $\Delta_k$ can further be incorporated into equation [4] for each satellite as follows: (i) if the satellite is LOS, then $\Delta_k=0$, and there is nothing to do, and (ii) if the satellite is NLOS-R, then equation [4] can be written as equation [7]:

$$\delta z_k = [-e_{k1}+2\cos(e), -e_{k2}, -e_{k3}, 1]\delta x \qquad [7]$$

If the satellite is NLOS-L, then equation [4] can be written as equation [8]:

$$\delta z_k = [-e_{k1}-2\cos(e), -e_{k2}, -e_{k3}, 1]\delta x + 2w\cos(e) \qquad [8]$$

In equations [7] and [8], the values $e_{k1}$, $e_{k2}$, $e_{k3}$ represent the first second and third elements of the unit vector $e_k$ and can be written in terms of the elevation angle, e, and the azimuth angle, β, of satellite k, as shown in equation [9].

$$[e_{k1}, e_{k2}, e_{k3}] = [\cos(e)\sin(\beta), \cos(e)\cos(\beta), \sin(e)] \qquad [9]$$

In FIG. 5A, the position of the satellites relative to receiver 502A are represented in two dimensions for illustration purposes. Generalizing the above scenario 500 to three dimensions introduces another component, sin(β), that contains the azimuth angle of the satellite relative to the coordinate system (X,Y,Z), as shown in equation [10]. In particular, as expressed in equation [10], multivariable equations incorporating LOS, NLOS-R, and NLOS-L satellites can be used during location calculations. Accordingly, equation [9] and equation [10] represents example calculations that receiver 502A may use for location determination according to the coordinate system (X,Y,Z) and clock offset (i.e., difference between transmitting satellite's clock and the clock of receiver 502A).

$$\begin{array}{c} LOS: \\ NLOS\text{-}R: \\ NLOS\text{-}L: \end{array} \begin{bmatrix} \delta z \\ \delta z \\ \delta z - 2w|\sin(\beta)\cos(e)| \end{bmatrix} = \qquad [10]$$

$$\begin{bmatrix} -\cos(e)\sin(\beta) & -\cos(e)\cos(\beta) & -\sin(e) & 1 \\ -\cos(e)\sin(\beta) + 2|\sin(\beta)\cos(e)| & -\cos(e)\cos(\beta) & -\sin(e) & 1 \\ -\cos(e)\sin(\beta) - 2|\sin(\beta)\cos(e)| & -\cos(e)\cos(\beta) & -\sin(e) & 1 \end{bmatrix} \begin{bmatrix} \delta x \\ \delta y \\ \delta z \\ \delta_b \end{bmatrix}$$

In equation [10], all the satellites that are LOS will have rows that are like that shown by the row labeled "LOS". As such, there may be one or more such rows in some examples. Similarly, for satellites that are NLOS-R, there may be one or more rows as the one labeled "NLOS-R". Equation [10] is similar for satellites that are NLOS-L.

Figure 5B:
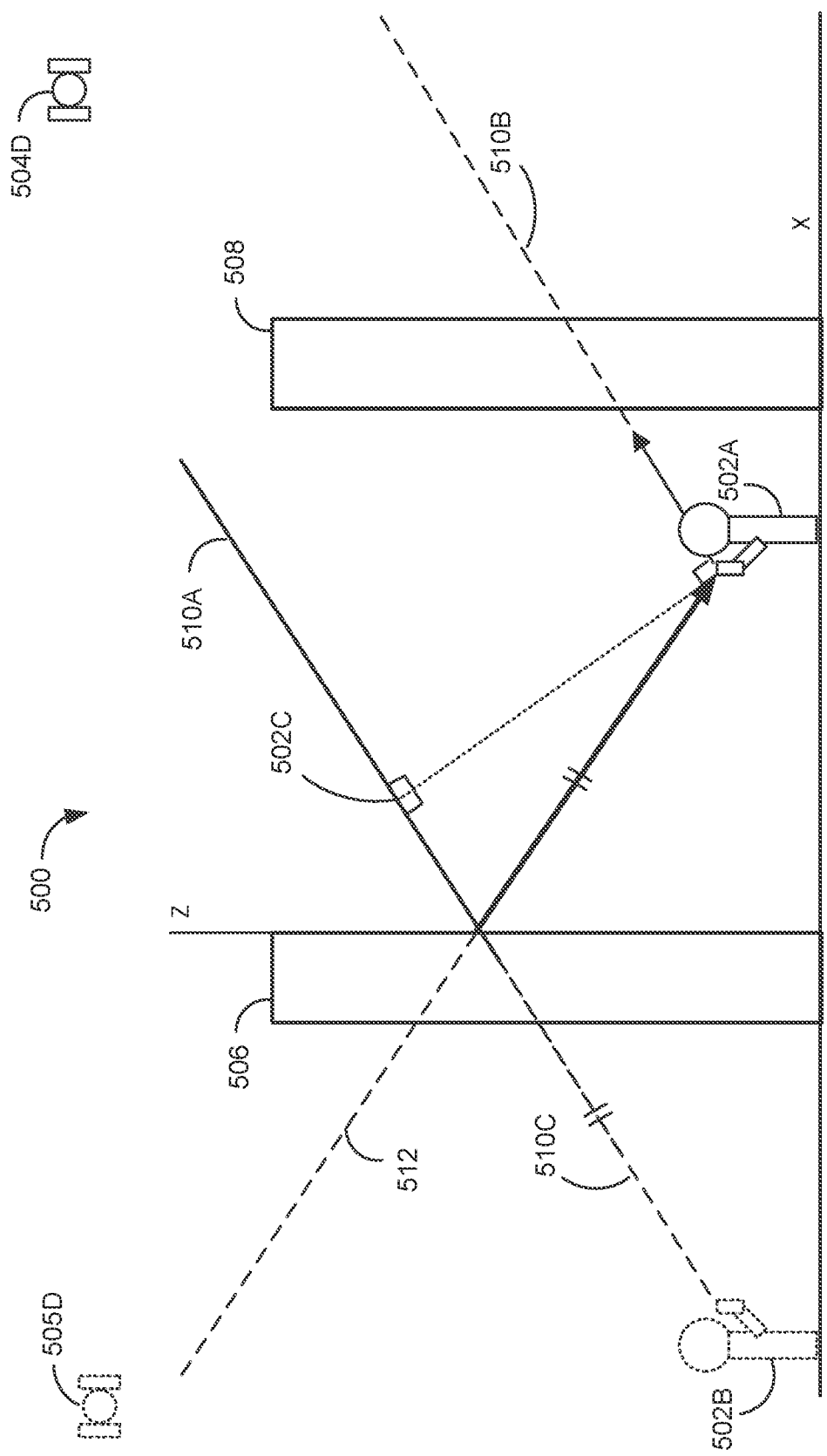
FIG. 5B illustrates the example scenario of FIG. 5A showing the receiver performing location determination.

FIG. 5B illustrates scenario 500 showing receiver 502A performing location determination. As shown in FIG. 5B, the reflection of the satellite may be considered about the plane of reflecting surface of feature 506 producing a new estimated satellite position 505D. Similarly, not shown in FIG. 5B, reflected satellite positions can be defined for other satellites, such as 504A, that are blocked from directly transmitting signals to receiver 502A at their current orientation. These reflected satellite positions (e.g., reflected satellite position 505D) can used to solve simultaneous equations (or a series of equations) for the as-yet-unknown user position (e.g., receiver 502A) and additional path lengths traveled due to reflections. By using the equations above, receiver 502A may accurately determine its location.

As shown with equation [1], the navigation equation includes a term $\delta \underline{z}$ that corresponds to a vector of measurement residuals. Each element k of this vector contains the difference between the measured range to satellite k and the expected range to that transmitting satellite. In the previous techniques described in FIG. 5A, $\delta \underline{z}$ is constructed using the true satellite position, satellite 504D, and then adjusted by $\Delta_k$. In other words, $\delta \underline{z}$ is made up of: the measured range and an adjustment to the measured range minus the expected range from the a-priori position to the true satellite position. Using techniques depicted in FIG. 5B, an equivalent formulation can be used that uses the measured range (with no further adjustment) minus the expected range to the reflected satellite position in order to provide the same result and accurately determine the location of receiver 502A.

As shown in FIGS. 5A, 5B multiple approaches can be used to calculate the location of receiver 502A in a way that factors extra paths traveled by any reflected signals. In some examples, both techniques may be used as a way to check prior results. For instance, if an inaccurate measured range was used with regards to satellite 504D, the location equations would indicate the position of receiver 502A is at receiver 502B, the reflected receiver position. As such, if the same inaccurate measured range was used with the reflected satellite 505D, the location equations may determine an accurate location of receiver 502A (i.e., between features 506, 508). While both approaches can be applied to multiple reflections, the alternate solution (using the reflected satellite position) can be described most elegantly.

Figure 5C:
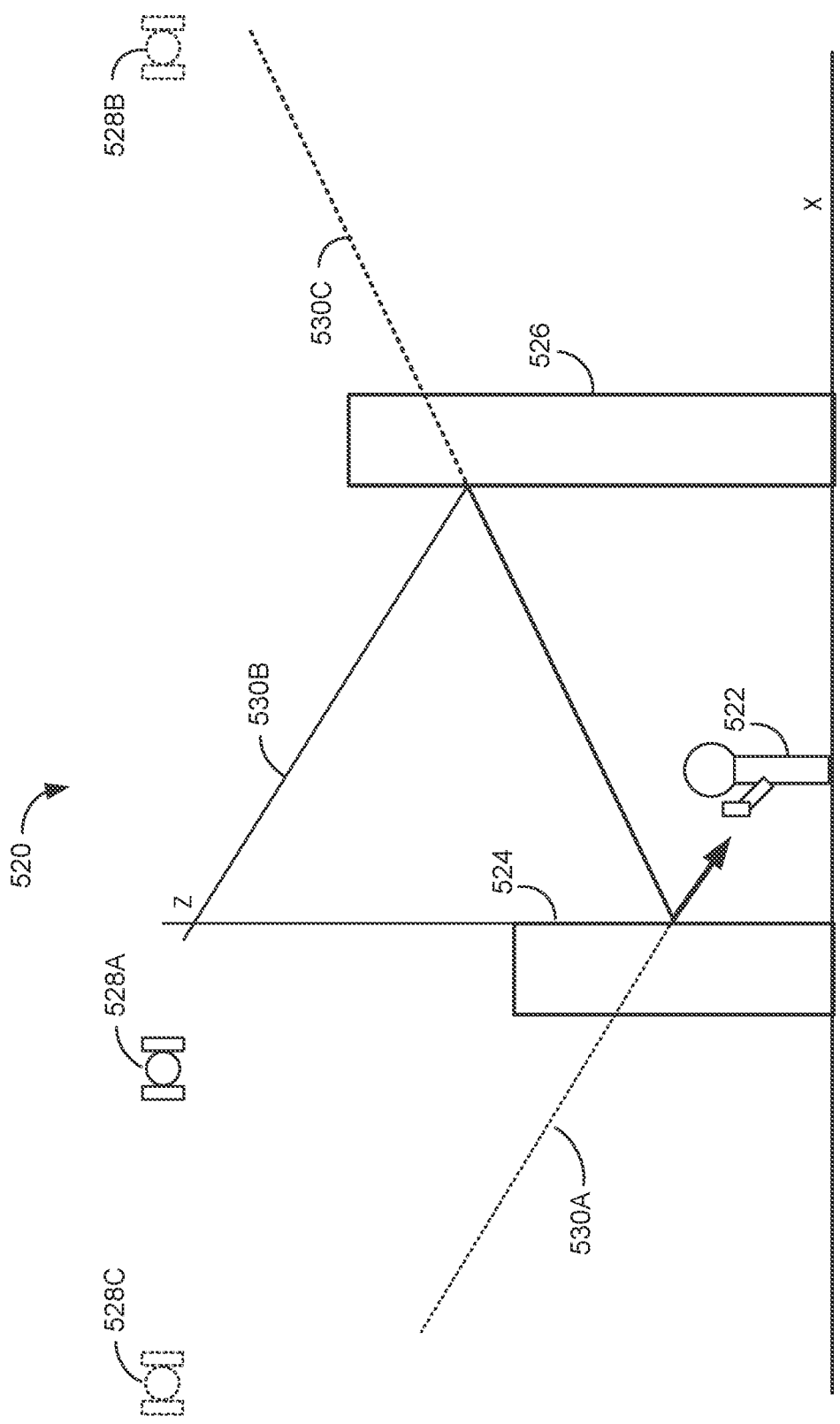
FIG. 5C illustrates an additional example scenario showing a receiver performing location determination.

FIG. 5C illustrates an additional scenario 520 showing receiver 522 performing location determination. Particularly, receiver 522 may perform location calculations using one or more signals that reflected prior to reaching receiver 522. As shown in FIG. 5C, scenario 520 includes receiver 522 positioned in between features 524, 526 receiving signals from satellite 528A. Scenario 520 represents an example situation where receiver 522 uses a signal (e.g., signal 530B) to calculate location after the signal bounces off multiple features (i.e., a double reflection).

In the example implementation, scenario 520 shows receiver 522 attempting to receiver signals from satellite 528A. The direct path between receiver 522 and satellite 528A is blocked by feature 524. An indirect path, however, can deliver signals (e.g., reflected signal 530B) from satellite 528A to receiver 522 as further shown in FIG. 5C. Particularly, the indirect path shows reflected signal 530B reflecting off feature 526 and then feature 524 before reaching receiver 522. As previously shown in FIG. 5B, calculations can involve reflecting a location of a satellite around a reflecting plane (e.g., satellite 504D to reflected position satellite 505D). Applying the technique to scenario 520, reflecting the position of satellite 528A about the reflecting side of feature 526 can result in reflected satellite position 528B.

After applying the above technique to determine reflected satellite position 528B, the location determination process is reduced to a single reflection, which can further be refined by replacing reflected satellite position 528B with a reflection around the reflecting surface of feature 524. This secondary reflection produces reflected satellite position 528C as shown in FIG. 5C.

Although the respective positions of satellite 528A and reflected satellite positions 528B, 528C are shown for illustration purposes and do not represent the actual scale or positions of the satellites relative to receiver 522, scenario 520 shows that the successive reflected satellite positions 528B, 528C enables computation of receiver 522 location while also accounting for the additional path traveled by reflected signal 530B due to reflections. As also shown in FIG. 5C, signal paths 530A, 530C represent respective paths that simulate potential paths that signals would travel from a satellite positioned in reflected satellite positions 528B, 528C to receiver 522 if features 524, 526 were not present. As such, other example implementations may involve determining the location of a receiver using signals that reflected more than two times before reaching the receiver.

Figure 6:
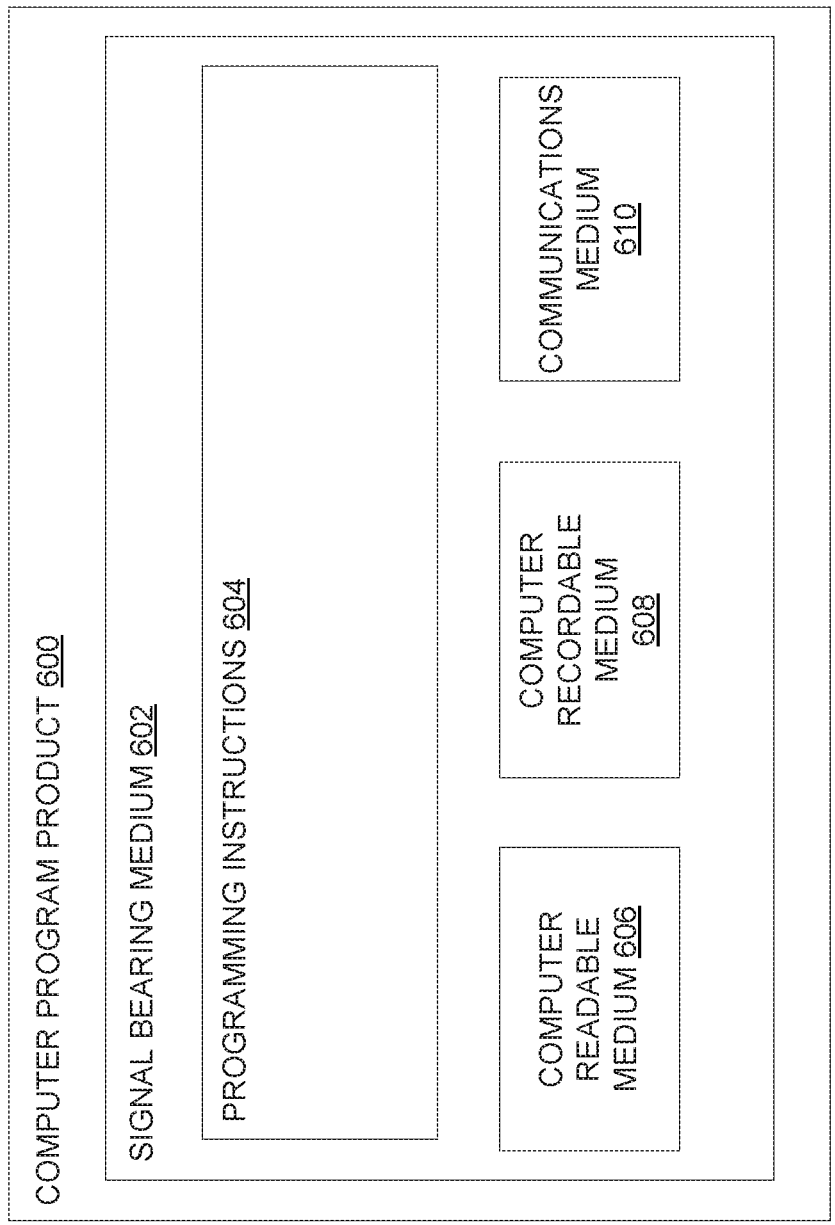
FIG. 6 is a schematic illustrating a conceptual partial view of an example computer program product that includes a computer program for executing a computer process on an example device.

FIG. 6 is a schematic illustrating a conceptual partial view of an example computer program product that includes a computer program for executing a computer process on a computing device, arranged according to at least some embodiments presented herein one embodiment, the example computer program product 600 is provided using a signal bearing medium 602.

The signal bearing medium 602 may include one or more programming instructions 604 that, when executed by one or more processors may provide functionality or portions of the functionality described above with respect to FIGS. 1-3 and FIGS. 4A-4D. In some examples, the signal bearing medium 602 may encompass a computer-readable medium 606, such as, but not limited to, a hard disk drive, a Compact Disc (CD), a Digital Video Disk (DVD), a digital tape, memory, etc.

In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the processor 112 of FIG. 1 may be configured to provide various operations, functions, or actions in response to the programming instructions 604 conveyed to the processor by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a device, such as the device 100 illustrated in FIG. 1. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
   receiving, at a receiver, positioning signals from a plurality of satellites;
   determining a general location of the receiver;
   determining respective angles of reception for the positioning signals, wherein an angle of reception for a given positioning signal is indicative of an orientation of a satellite relative to the receiver;
   determining topography information for the general location, wherein the topography information indicates a given elevation and position for one or more features at the general location;
   identifying, at the receiver using the topography information and the determined respective angles of reception of received positioning signals, one or more of the positioning signals that is a reflected signal and one or more of the positioning signals that is a direct signal from the plurality of satellites, wherein a reflected signal is a positioning signal that is reflected off one or more features at the general location prior to being received at the receiver;
   estimating, via a sensor of the receiver, a distance between the receiver and a feature from which at least one of the one or more reflected signals is reflected;
   determining a second location of the receiver based on solving a set of simultaneous linear equations corresponding to the plurality of satellites, wherein an equation of the set of linear equations for a satellite associated with the at least one of the one or more reflected signals is a function of the estimated distance between the receiver and the feature; and
   outputting the second location of the receiver.

2. The method of claim 1, wherein the receiver is a Global Navigation Satellite System (GNSS) receiver.

3. The method of claim 1, wherein determining an angle of reception for a received positioning signal comprises:
   determining a position of a satellite that sent the received positioning signal based on information in the received positioning signal; and
   based at least in part on the position of the satellite, determining the angle of reception for the received positioning signal.

4. The method of claim 3, wherein determining the angle of reception for the received position signal is further based on a respective elevation and position of one or more features positioned proximate the receiver.

5. The method of claim 1, wherein determining the general location of the receiver comprises:
   determining the general location of the receiver using at least one positioning signal from three satellites of the plurality of satellites.

6. The method of claim 1, wherein determining the general location of the receiver comprises:
   determining the general location using a trilateration calculation.

7. The method of claim 1, wherein determining topography information for the general location comprises:
   receiving one or more maps that include the topography information for the general location.

8. The method of claim 1, wherein the one or more features at the general location correspond to one or more buildings.

9. The method of claim 1, wherein the topography information specifies the approximate height and location for one or more buildings at the general location.

10. A system comprising:
   one or more processors; and
   a non-transitory computer-readable medium, configured to store instructions, that when executed by the one or more processors, cause the system to perform functions comprising:
      receiving positioning signals from a plurality of satellites;
      determining a general location of the system;
      determining respective angles of reception for the positioning signals, wherein an angle of reception for a given positioning signal is indicative of an orientation of a satellite relative to the system;
      determining topography information for the general location, wherein the topography information indicates a given elevation and position for one or more features in the general location;
      identifying, using the topography information and the determined respective angles of reception of received positioning signals, one or more of the positioning signals that is a reflected signal and one or more of the positioning signals that is a direct signal from the plurality of satellites, wherein a reflected signal is a positioning signal that is reflected off one or more features at the general location prior to being received at the system;

estimating, via a sensor of the system, a distance between the system and a feature from which at least one of the one or more reflected signals is reflected;

determining a second location of the system based on solving a set of simultaneous linear equations corresponding to the plurality of satellites, wherein an equation of the set of linear equations for a satellite associated with the at least one of the one or more reflected signals is a function of the estimated distance between the system and the feature; and outputting the second location of the system.

11. The system of claim 10, wherein identifying the one or more of the positioning signals that is a reflected signal is based on an elevation and position of a feature reflecting the reflected signal.

12. The system of claim 10, wherein identifying the one or more of the positioning signals that is a reflected signal is based on the angle of reception for the reflected signal and position of a satellite that sent the reflected signal relative to the system.

13. A non-transitory computer-readable medium configured to store instructions, that when executed by a computing system comprising one or more processors, causes the computing system to perform functions comprising:

receiving positioning signals from a plurality of satellites;

determining a general location of the computing system;

determining respective angles of reception for the positioning signals, wherein an angle of reception for a given positioning signal is indicative of an orientation of a satellite relative to the computing system;

determining topography information for the general location, wherein the topography information indicates a given elevation and position for one or more features in the general location;

identifying, using the topography information and the determined respective angles of reception of received positioning signals, one or more of the positioning signals that is a reflected signal and one or more of the positioning signals that is a direct signal from the plurality of satellites, wherein a reflected signal is a positioning signal that is reflected off one or more features at the general location prior to being received at the computing system;

estimating, via a sensor of the computing system, a distance between the computing system and a feature from which at least one of the one or more reflected signals is reflected;

determining a second location of the computing system based on solving a set of simultaneous linear equations corresponding to the plurality of satellites, wherein an equation of the set of linear equations for a satellite associated with the at least one of the one or more reflected signals is a function of the estimated distance between the computing system and the feature; and outputting the second location of the computing system.

14. The non-transitory computer-readable medium of claim 13, wherein the function implements a trilateration calculation using the respective positions of the satellites associated with the at least one of the one or more reflected signals and the direct signals.

15. The non-transitory computer-readable of claim 13, wherein determining the angle of reception for a received positioning signal comprises:

determining the position of a satellite that sent the received positioning signal based on information in the received positioning signal; and based at least in part on the position of the satellite, determining the angle of reception for the received positioning signal.

\* \* \* \* \*